Figure 1:
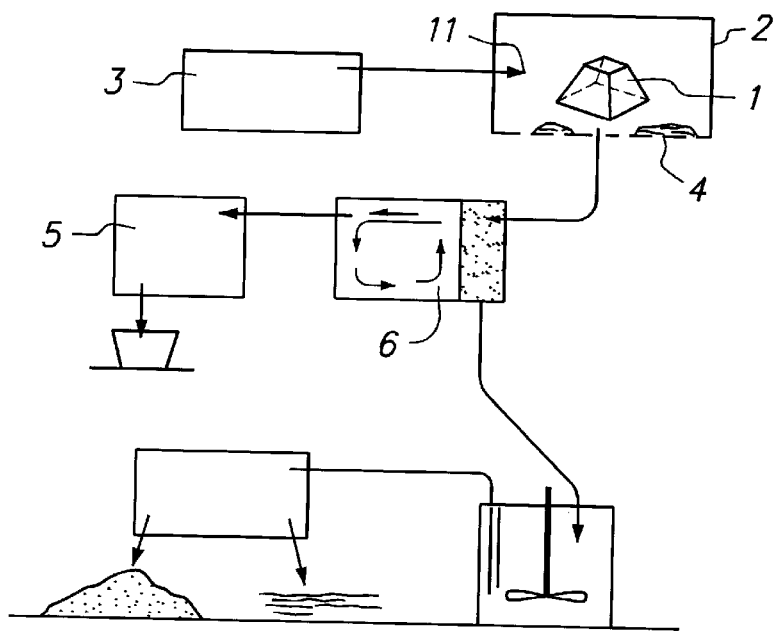

United States Patent [19]
Botten

[11] Patent Number: 5,915,634
[45] Date of Patent: Jun. 29, 1999

[54] METHOD AND DEVICE FOR SEPARATING HARDER FROM LESS HARDER MATERIAL

[76] Inventor: Baard Botten, Hauanveien 33, Drammen, Norway, N-3031

[21] Appl. No.: 08/776,261

[22] PCT Filed: Jul. 19, 1995

[86] PCT No.: PCT/NO95/00130

§ 371 Date: May 1, 1997

§ 102(e) Date: May 1, 1997

[87] PCT Pub. No.: WO96/02326

PCT Pub. Date: Feb. 1, 1996

[30] Foreign Application Priority Data

Jul. 20, 1994 [NO] Norway .................................... 942717

[51] Int. Cl.$^6$ .................................................... B02C 19/18
[52] U.S. Cl. .............................. 241/1; 241/20; 241/24.13; 241/301
[58] Field of Search ................... 241/1, 301, 14, 241/79, 24.13, 24.14, 24.15, 20

[56] References Cited

U.S. PATENT DOCUMENTS

| | | | |
|---|---|---|---|
| 4,662,893 | 5/1987 | McIntosh | 241/1 |
| 4,986,479 | 1/1991 | Swarden et al. | 241/1 |
| 5,115,983 | 5/1992 | Rutherford | 241/1 |
| 5,234,172 | 8/1993 | Chupka et al. | 241/1 |

FOREIGN PATENT DOCUMENTS

| | | |
|---|---|---|
| 597 322 | 6/1934 | Germany . |
| 1 287 916 | 9/1969 | Germany . |
| 27 53 000 | 5/1979 | Germany . |
| 28 30 574 | 5/1982 | Germany . |
| 31 40 294 | 11/1983 | Germany . |
| 0089538 | 7/1981 | Japan ........................................ 241/1 |

OTHER PUBLICATIONS

A.F. Taggart, *Handbook of Mineral Dressing: Ores and Industrial Materials*, John Wiley and Sons, Inc., New York, 1947, Section 10, Articles 1 and 2, pp. 10–01 to 10–03.

*Primary Examiner*—Mark Rosenbaum
*Attorney, Agent, or Firm*—Heller Ehrman White & McAuliffe

[57] ABSTRACT

Method and device for separating harder from less harder substances of a compact mass block (1) consisting of hard and less hard substances, such as magnesium or aluminum from slag and refuse containing magnesium or aluminum, thereby directing at least one fluid beam having at least 400 bar pressure against the mass block (1) for separating the harder from the less harder substances by breaking out pieces from block, whereby the nozzle or nozzles (11) and the mass block (1) are moved in relation to each other and the substances are cooled with water to reduce metal loss by oxidation.

12 Claims, 1 Drawing Sheet

METHOD AND DEVICE FOR SEPARATING HARDER FROM LESS HARDER MATERIAL

The present invention is related to a method and a device for separating harder from less harder substances, according to the preamble of the claims.

Known methods for extracting metal from slag and waste containing magnesium and aluminium, or for separating corresponding combinations of material compositions are technically complicated, very often environmentally demanding and consequently costly.

Magnesium metal is for example recovered from magnesium sludge which is moulded into blocks or filled on steel barrels when still in the melting phase and which contain magnesium in a matrix of salts and oxides. It is common to crush the blocks in several steps and simultaneously pick metal manually and also to screen the metal, whereby the residual sludge is removed from the process for final deposing or used in other connections. The process need huge mechanical units, independently of the need for capacity, to treat the material. Simultaneously relatively small amounts of magnesium sludge is generated at the different plants. Of this reason very few central plants in the world are performing recovering, hence the transport costs to such plants may be expensive, due to the distance and also because there are strong regulations connected with transport and packing of the magnesium sludge.

The process develops dangerous and troublesome gases which must be controlled. Additionally, the strongly hygroscopical properties makes that for dry treatment of magnesium sludge there are quite specific demands for the choice of crushing and screening equipment as well as to the conveyors and equipment for treatment of dust and gases.

Many plants are depositing or until recently they have deposited, the sludge, as the cheapest and most convenient solution. As the environmental regulations have been sharpened more and more industrialized countries now have forbidden such depositing.

Another example is recovering of aluminium metal from white dross, being as today performed by circumstantial and expensive methods. The first step in the treatment of dross cooled in pans, normally is a mechanical concentration through several crushing steps, with screen separation of the metallics from the non-metallics. Concentrates of approximately 60–70% aluminium metal is achieved before transportation for melting to a rotary salt furnace. By cooling the dross in pans it is, however, calculated with a metal loss of approximately 1% aluminium metal per minute in the initial cooling period after the skimming has been performed.

Cooling drums have in the latest ten years increasingly been used as substitute for the pan-cooling. Hereby is rapid cooling achieved and less burning of the metal grains. Dross from cooling drums have 35–60% aluminium.

Dross which is cooled in a drum is easy to handle but has the disadvantage that is not easily can be concentrated substantially in a crushing or sieving plant because the cooling method tangles metal and oxides in such a way that direct treatment in a rotary salt furnace becomes the inevitable next production link.

The rotary salt furnace process is expensive and harmful to the environment as it produces substantially the same amount of refuse as the dross concentrate input. A dross having 50% aluminium and 50% oxides claims 50% salt additives or the same amount of salt as the non-metal portion of the dross.

Deposition of salt cake refuse has developed to be a large problem in several industrialized countries as the salt solution penetrates into the ground and pollutes the subsoil water. Recovery plants for salt are constructed in several countries, but the salt from the recovery is more expensive than new salt. Nevertheless, the secondary smelters in such countries are forced to deliver, and to pay a tonnage fee for delivered salt cake. Moreover, they are forced to buy the expensive salt back again.

Lacks and negative sides by existing processes have initiated substantial efforts to simplify the same or develop new processes, so far this has not led to results which are in practical use.

The above mentioned disadvantages and limitations by known designs are avoided with the present invention as defined with the features stated in the claims.

In relation to methods which are known and commonly in use today, the method and device according to the present invention provides a substantially simpler and cheaper plant and equipment which can treat smaller amounts in economical competition with larger, vary often remote lying central plants. It is achieved with the use of flushing at a very high pressure, better separation and cleaner products, especially cleaner metal concentrates, furthermore substantially quicker partition of the mass block as opposed to known wet processes is achieved, which together with rapid cooling effect from the flushing and cleaning water, restrains oxidisations and loss of valuable constituency such as metal, during the process as such.

The present invention may be used to separate softer materials from harder materials, independently of which material is of interest.

With the present invention is achieved also a number of other advantages and improvements in relation to prior art. The plant is compact hereby enabling easy control and neutralization of dangerous and troublesome gas emission. Furthermore, the method is rapid, considering a wet process. This is necessary by treatment of magnesium and aluminium slag which react strongly exothermic with development of a number of dangerous and troublesome gases under the influence of water and air. Successively the metal content is reduced when water and air is supplied. Over time such reactions will reduce or completely remove the metal content in the basic starting material.

The method according to the invention provides cleaner products than in most cases because it is avoided that pollution are baked into metal to the same degree as a multi-step crushing treatment of magnesium and aluminium may result in. It furthermore provides better recovery with the higher yield of for example magnesium and aluminium, than for crushing or milling operations and especially better than by melting of aluminium in a rotary salt furnace where the loss can be approximately 10%.

The method according to the present invention has proved to be especially well suitable to separate magnesium from slag and refuse containing magnesium and correspondingly to separate aluminium from slag and refuse containing aluminium, however the method is not limited to these fields. To the contrary the principle may be used even in other fields where harder material is to be separated from surrounding somewhat softer material and where of different reason it is not suitable to perform the process in a crusher plant or by low pressure washing, partly due to the time consumption and partly due to possible side effects.

Even if the invention has proven to be well suited by recovery of metal from slag and refuse containing magnesium and aluminium, it advantageously may be used to separate other materials being a composition of several components having different degrees of hardness.

Black dross, which can contain 3–10% aluminium metal, therefore advantageously also may be treated with the present invention. The treatment or fragmenting thereby can be part of a complete process for recover of metals, oxides and salts or only be performed to recover metal and aluminium oxides, whereby dissolved salts (substantially NaCl) is let out to the sea.

During the performance of the method according to the present invention, a fluid beam under very high pressure, bursts soft or brittle substances from the harder or tough substances. The beam pressure is adjusted to the specific material which is to be treated and may vary from a few hundreds up to several thousand bars.

Fluid beams having very high pressure have proved to be very suitable to separate hard and ductile fixed materials such as metals, from brittle, soft or sandy materials having the metal particles embedded. The high pressure beams break up the block after the boundary surfaces between the parts having different mechanical properties, characterized by for example differences in hardness, brittleness or toughness. The parts which most easily are influenced by the fluid beam, are teared loose and washed away from the more resistant parts.

The process may take as a starting point a compact block having slag and included metal in the shape of partly as lumps of different size and shapes and partly metal having ball shape with small diameter.

There seems to exist a threshold value for the pressure in the fluid beams as the less resistant parts below this threshold value will be washed slowly mechanically from the material, be dissolved in the fluid or washed away or reacting chemically with the fluid for thereafter to be washed away.

Below the threshold value mechanically resistant parts such as metals may be reduced or disappeared completely if undesirably/unwanted reactions are allow to develop.

Above this threshold value, however, a rapid outbreaking and removing of less resistant parts is achieved, thereby releasing the hard and tough parts. Reactions which reduces for example the metal content will not have time to develop to such a degree that it means anything.

The threshold value will vary according to the composition of the material to be treated.

At the present time there has not been found any specific threshold value for the transition between normal washing and crushing of the softer material by treatment of different material composition, it is however, assumed that such a threshold value possibly may be found in the range of 300–500 bar and that the relevant working pressure in connection with especially magnesium and aluminium will be in the range of from 500 bar and upwards, even above 1000 bar.

High pressure flushing, however, is superior to other methods when it comes to produce clean metal having a minimum of metal loss for magnesium sludge, aluminium dross and black dross, because the mass block is crushed just as well as in mechanical crushing machines, without damaging, crushing or peeling metal to an undesired degree. Furthermore high pressure flushing rapidly is breaking down the block in such a way that reactions which reduce the metal content do not have time enough to make substantial damage. The process of high pressure flushing provides a compact plant making it easy to catch gases which may be developed and further treat such gases.

The above described advantages are achieved with the method and the device according to the present invention, as described with the features stated in the claims.

In the following the invention is described based on two embodiments disclosed in the drawings, where FIG. 1 discloses schematically a block diagram of a first embodiment of the invention and FIG. 2 discloses schematically a block diagram of an alternative embodiment.

The two figures both disclose a block 1 comprising a material mixture of at least two components having different hardnesses (mechanical properties) adapted for the functioning of the process, such as metal in a slag block in a container 2 in which at least one nozzle 11 for high pressure flushing is secured to a lever or frame adapted for the purpose, which lever or frame being displaceable within the container, horizontally as well as vertically in such a way that the nozzle or nozzles 11 successively cover the surface of the block 1 with the high pressure beams. Hereby parts of the block will be peeled off, some of which being so small that they will fall through the grating under the block 1, which may be fixed or shaped as a rotating disc or through openings in the lower part of the waste container. Other parts will rest on the grating 4 for successive treatment of the higher pressure beams as the beams break up and excavating into the block, separating the parts residing on the grating, thereby eventually to flush out softer material. The high pressure beams conveniently may come from an aggregate 3 providing high pressure water.

The high pressure beams may origin from a flushing head with a programmed movement of the beams or flushing head, such that the beams seek after lumps which are to be broken up. Whether the beams origin from a lever or a frame comprising a plurality of nozzles 11, one flushing head comprising several or only one beam, it is substantial that the beams are aimed correctly and ensure that the entire block is broken up. The nozzle head or nozzle heads may be directed towards the block vertically downwards or possibly be turned from this position to a substantially horizontal direction towards the block. It also must be possible to guide the nozzle head or nozzle heads under the grating 4 to enable flushing upwards from the underside. As fluid, water may be used or other convenient liquids.

Lumps of material resisting the high pressure beams, such as metal which is larger than the holes in the grating 4 will remain on the grating and may be removed after the treatment of the block 1 has been terminated.

Dependent on desired final product, the materials may be used directly, recycled for repeated treatment, screened or treated further such as in a drum separator 6, a crushing and screening plant, a washing drum or a drying plant 5. For further treatment the material is transported from the grating 4 to the drum separator 6 where high pressure flushing again is used to separate parts having different mechanical properties, especially metals from slag mixtures. Preferably the material is brought into the drum separator 6 axially through the separator to the other end of the separator where the treatment is started. In a somewhat inclined drum separator high pressure beams are directed against the material whereby this simultaneously is transported up from a water bath, in such a way that the material is crushed against the back and side walls of the drum thereafter to fall down into the water bath and in this way avoiding as much as possible air influence on the material.

The material is treated in the drum 6 by means of one or more nozzles treating the material successively many times by means of the high pressure beams.

The drum separator 6 is preferably inclined in such a way that the material due to the rotation of the drum is moved downwards in the drum opposite the direction of the conveyor for bringing the material into the drum. This part of the drum comprises longitudinal grooves or lifters to provide a possibility for the material to be transported with the rotation of the drum, thereby to avoid that the material is flushed away by the high pressure beams, but to the contrary is broken down and crushed and at the same time cleaned as effectively as possible.

Upon the high pressure flushing the material is transported to a screen section in the drum 6 where the finer material, below a threshold limit to be chosen, is removed from the system with or without supply of common flushing water (wet screening). Suitably a gutter 13 collects the finer material and the water from the entire plant and removes this from the process.

Material with oversize continuous on the grating to the end of the drum 6 where lifters, due to the rotation of the drum, will lift the material up to the conveyor and back to the opposite end of the drum 6 for repeated treatment from the high pressure beams. In the drum is provided a treatment in a closed circuit with removing of the finer material.

When the oversize substances are clean enough, what may be decided visually or by experience connected to the treatment time, the product (the collected fraction) is taken off by means of a shutter, a gutter or such 5, which is brought in under the output of the conveyor.

Figure 2:
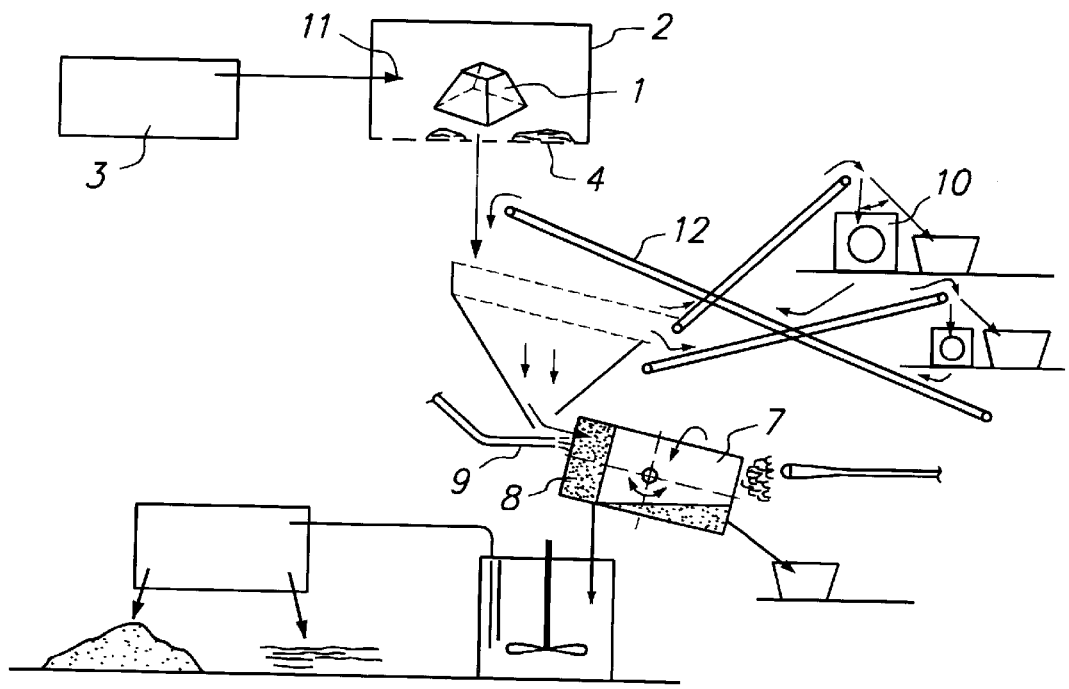

FIG. 2 discloses another embodiment of the invention, especially developed for those cases where parts which is broken from the mass block such as material containing magnesium and aluminium, in a size penetrating the grating 4 but not being sufficiently clean as to the component or the components which are to be taken out. Hereby the material may be separated into two or more fractions before further treatment, namely a fine fraction being directed to the end cleaning in a drum separator or to a washing drum and one or more coarser fractions being directed to a closed crushing circuit where salts and oxides are beaten loose from the metal and crushed down to fine material which later may be extracted.

A vibration gutter is feeding water, sludge and lumps coming through the grating 4. Shaking rods at the end of the gutter let fine material come through. This is transported through a vibration gutter to at lest one washing drum 7. Water and fine sludge are separated and removed from the process by means of the gutter 13, through a grating 8 arranged at the inlet of the washing drum.

Cold fresh water is supplied to the drum through a nozzle 9 in such an extent that the temperature is maintained substantially at the temperature level of the supplied fresh water. The washing may endure from a couple of minutes to 30–40 minutes and in some cases even longer, until the metal concentrate in the washing drum has reached a desired degree of purity.

Surface water and fine sludge come through the grating 8. When the desired degree of purity is achieved, a cover is placed on the inlet to the drum and the drum 7 is emptied for water and fine sludge through the grating 8, as disclosed in FIG. 2, whereas the metal concentrate is remaining in the drum. Immediately thereafter a strong heat flow is guided into the drum opening whereby the drum still is rotating, to dry out the metal concentrate before it starts to react with water and air. As soon as the concentrate is dry, the reaction is slowed down substantially.

Dry metal concentrate is filled into barrels or containers which thereafter are sealed and secured in the best suitable way against water and air.

Larger lumps are brought from the gutter above the rods to a conveyor with a slow speed, transporting the pieces to a hammer crusher 10 where salts and other pollutions are beaten loose from the metal. A vibration gutter and the conveyor 12 transport the material from the crusher to a screen where the fine material is separated and brought to the washing drum 7, via vibration gutters for final washing together with the fine material coming directly from the flushing chamber.

Grains having oversize from the screen are brought back to the crusher 10. From the conveyor 12 clean metal pieces may be picked out manually or the material may be collected and circulate through the crusher 10 until the material has achieved acceptable degree of purity, in that salts, oxides and other impurities are crushed down and separated from the metal.

The metal concentrate may be brought to be washed clean in the washing drum 7 or it may be taken out through a shutter.

The largest metal pieces, remaining on the grating 4, are flushed clean on the grating 4 and picked up manually.

The following factors are substantially in this process. To maintain the temperature low and avoid undesired metal reducing reactions, it is important to use large amounts of water. The process has to be very quick to avoid undesired reactions to start and develop. The crushing step is brought in to reduce the treatment time for the medium size fractions which not so easily may be flushed clean on the grating 4, and contain so much salt coating or non-metallic compounds which is difficult to dissolve, that direct cleaning in a washing drum will take disproportionally long time.

I claim:

1. A method for separating a metal selected from magnesium and aluminum from a compact mass block of slag or refuse containing metal, the method comprising directing at least one fluid beam having a pressure of at least 400 bar from at least one nozzle against the mass block and moving the at least one nozzle and the mass block in relation to one another, whereby pieces are broken from the mass block by the at least one fluid beam, and the mass block and the pieces broken therefrom are cooled by the at least one fluid beam to reduce metal loss by oxidation.

2. The method of claim 1 where the fluid is water.

3. The method of claim 1 where the pressure of the at least one fluid beam is at least 500 bar.

4. The method of claim 3 where the pressure of the at least one fluid beam is at least 1000 bar.

5. The method of claim 1 where the step of moving the at least one nozzle and the mass block in relation to one another comprises rotating the mass block about a vertical axis and either maintaining the at least one nozzle stationary or reciprocating the at least one nozzle.

6. The method of claim 1 further comprising the step of treating the pieces broken from the mass block with a pressurized fluid beam in a drum separator and/or with water in a washing drum.

7. The method of claim 1 further comprising the step of crushing and screening the pieces broken from the mass block.

8. The method of claim 7 further comprising the step of treating the crushed and screened pieces with a pressurized fluid beam in a drum separator and/or with water in a washing drum.

9. The method of claim 1 where the metal is magnesium and the mass block comprises magnesium sludge.

10. The method of claim 9 where the magnesium sludge comprises magnesium in a matrix of salts and oxides.

11. The method of claim 1 where the metal is aluminum and the mass block comprises white dross.

12. The method of claim 1 where the metal is aluminum and the mass block comprises black dross.

* * * * *